United States Patent
Macklyn

[11] 3,882,608
[45] May 13, 1975

[54] DIFFERENTIAL-PROBE HOLE-LOCATION OR CONCENTRICITY GAUGE

[75] Inventor: Bruce A. Macklyn, Detroit, Mich.

[73] Assignee: Zero Gage Company, Detroit, Mich.

[22] Filed: Jan. 16, 1974

[21] Appl. No.: 433,718

[52] U.S. Cl. ............................................ 33/174 Q
[51] Int. Cl. ............................................ G01b 5/25
[58] Field of Search ........... 33/174 L, 172 D, 147 K

[56] References Cited
UNITED STATES PATENTS

| | | | |
|---|---|---|---|
| 2,766,532 | 10/1956 | Eisele | 33/174 Q |
| 3,119,187 | 1/1964 | Meyer | 33/147 K |
| 3,732,624 | 5/1973 | Eisele | 33/174 Q |

Primary Examiner—Richard E. Aegerter
Assistant Examiner—Richard R. Stearns

[57] ABSTRACT

A hollow barrel adapted to be rotatably mounted within a reference bore in a guide bushing seated in a master fixture contains a longitudinal bore communicating at its forward end with a transverse bore which in turn contains a pair of reciprocable coaxial probes urged apart from one another by a spring and having contact edges engaging bevels on coaxial telescoped outer and inner forward motion-transmitting rods. The outer rod is slidably mounted in ball bushings for ease of reciprocation and is secured at its rearward end to the forward end of a hollow rotary chuck on the rearward end of which is mounted a dial indicator holder containing a dial indicator. The inner motion-transmitting rod is coupled to the outer hollow rod for limited relative reciprocation without relative rotation, and its rearward end is engageable with the forward end of a rearward motion-transmitting rod slidably mounted in the rotary chuck and having its rearward end engageable with the plunger of the dial indicator. When a hollow handle secured to the rearward end of the barrel is rotated through a quarter turn, the two coaxial probes engaging the workpiece bore move radially relatively to one another in the same direction, transmitting one-half of their respective motions to their respective outer and inner motion-transmitting rods. This differential motion gives a direct reading of the eccentricity of the workpiece bore relatively to the reference bore.

10 Claims, 3 Drawing Figures

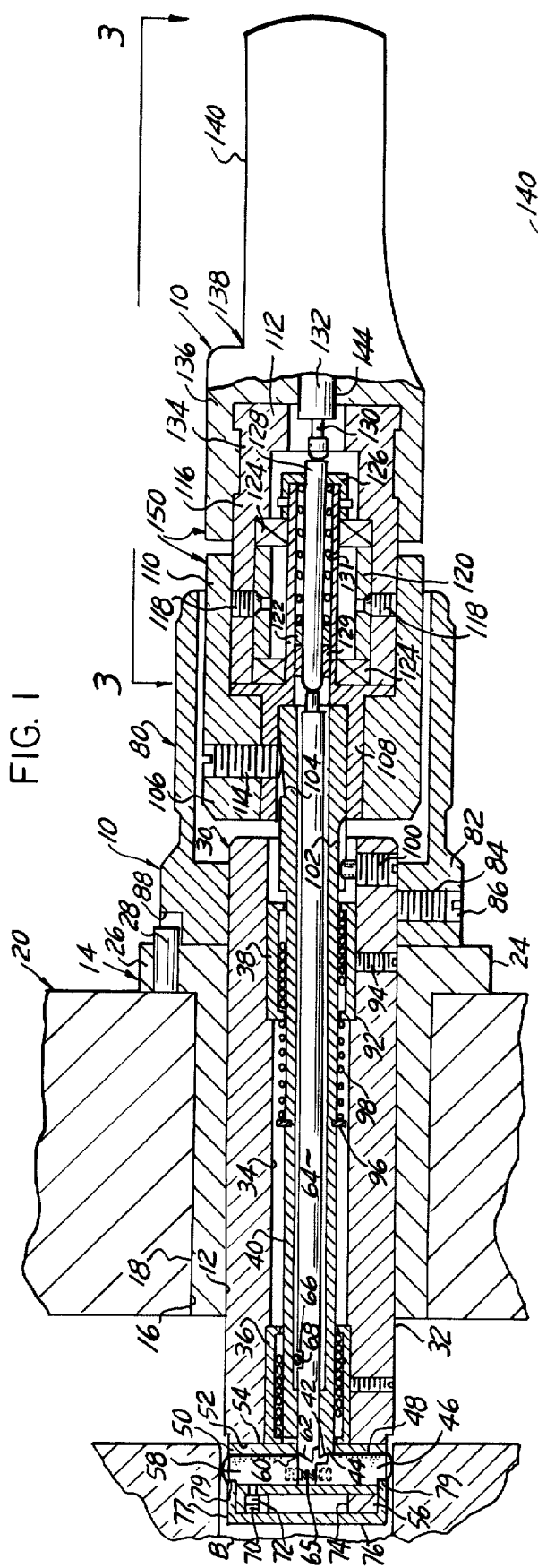

DIFFERENTIAL-PROBE HOLE-LOCATION OR CONCENTRICITY GAUGE

BACKGROUND AND SUMMARY OF THE INVENTION

In the use of a prior hole location gauge having a single radially-reciprocable probe for measuring the possible eccentricity of a workpiece bore relatively to a master fixture bore, it has been necessary to rotate the gauge barrel in order to "sweep" the bore and obtain a total indicator reading which reads the total movement of the probe. This reading is then divided by two in order to locate the actual center of the workpiece bore and thereby determine its departure from the desired center in order to obtain the eccentricity of the workpiece bore relatively to the reference bore. The present invention by the differential motion of its coaxial probes gives a direct reading of the eccentricity without requiring such bore sweeping and subsequent computation.

In the drawing,

FIG. 1 is a central longitudinal section, partly in side elevation, through a differential-probe hole-location or concentricity gauge, according to one form of the invention as mounted in the precision reference bore of a guide bushing seated in a master fixture while the forward end of the gauge is directly measuring the eccentricity of a workpiece bore and indicating it immediately upon a dial indicator;

FIG. 2 is a left-hand or front elevation of the forward end of the gauge of FIG. 1, removed from the workpiece bore and guide bushing, with the stop pin of the latter indicated in dotted lines; and FIG. 3 is a fragmentary top plan view of the rearward portion of the gauge of FIGS. 1 and 2, looking in the direction of the arrows 3—3 in FIG. 1 and showing the dial indicator and its mounting.

Referring to the drawing in detail, FIG. 1 shows a differential-probe hole-location or concentricity gauge, generally designated 10, according to one form of the invention, as rotatably mounted in the precision reference bore 12 of a guide bushing 14, the outer cylindrical surface 16 of which is snugly seated in the corresponding precision bore of a conventional master fixture, generally designated 20. Also shown in FIG. 1 is a workpiece W having a workpiece bore B, the concentricity or eccentricity of which is to be measured directly by the gauge 10 and indicated immediately on a conventional dial indicator 22 mounted on the rearward end of the gauge 10 in a manner subsequently described below. The precision guide bushing 14 is provided with a flange 24 in which is formed a bore 26 parallel to the axis of the reference bore 12 and in which is snugly mounted a stop pin 28, the purpose of which is described below.

The gauge 10 of the present invention includes a hollow shaft or barrel 30 having a precision cylindrical outer surface 32 snugly but rotatably mounted in the guide bushing reference bore 12 and containing a central bore 34 which is counterbored at its opposite end to receive conventional ball bushings 36 and 38 respectively. The ball bushings 36 and 38, also called linear motion bushings, are conventional and readily available from a plurality of independent sources on the open market, hence their details are beyond the scope of the present invention. Slidably as well as rotatably mounted in the ball bushings 36 and 38 is a tubular first motion-transmitting rod 40, the forward end of which is provided with a forwardly-projecting inclined nose portion 42 having an angle of inclination of 26° 34 mins. and engageable with the contact edge 44 of a round-ended first probe 46. The latter is reciprocably mounted in a radial bore 48 within a tubular guide bushing 50, the outer cylindrical surface 52 of which is snugly mounted in a radial bore 54 near the forward end portion 56 of the barrel or hollow shaft 30.

Also reciprocably mounted in the radial bore 48 is a round-ended second probe 58 having a contact edge 60 engageable with a forwardly-projecting nose portion 62 also inclined at an angle of 26° 34 mins. to a second motion-transmitting rod 64 mounted coaxially for relative reciprocation to and within the first hollow or tubular motion-transmitting rod 40 but prevented from rotation relatively thereto by a flat-bottomed slot 66 in the second rod 64 slidably engaged by a tangential pin 68 seated in the tangentially-drilled first rod 40. The 26 degree 34 minute angles on the nose portions 42 and 62 cause a given transverse linear motion of either probe 46 or 58 to move its respective motion-transmitting rod 40 or 64 exactly half of that distance. The inner ends of the probes 46 and 58 are recessed to receive the opposite ends of a helical compression spring 65 which urges them away from one another into engagement with the workpiece bore B. The guide bushing 50 is held within the bore 54 by a pointed or conical tipped set screw 70 which in turn is threaded through a threaded screw hole 72 in the forward end portion 56 of the barrel or hollow shaft 30. The forward end 56 of the hollow shaft 30 contains an opening 74 and is covered by a cup-shaped cap 76 secured to the forward end portion 56 of the hollow shaft 30 by a pair of screws 78 (FIG. 2). The flange 77 engages flats 79 on the sides of the probes 46 and 58 near their outer ends, so as to prevent rotation of the probes 46 and 58 in their common bore 48 while retaining them therein.

Mounted on the rearward end of the barrel or hollow shaft 30 is a hollow cup-shaped handle 80, the forward end wall 82 of which is drilled and threaded at 84 to receive a set screw 86 so as to provide a driving connection between the handle 80 and the barrel or hollow shaft 30. The end wall 82 of the handle 80 is provided with an arcuate quadrant slot 88 (FIG. 2) which engages the stop pin 28 and extends from 12 o'clock to 3 o'clock for limiting the rotation of the handle 80 and barrel or shaft 30° to 90°.

The barrel or hollow shaft 30 adjacent the ball bushing 38 is drilled and threaded radially to receive a set screw 94 which also holds the ball bushing 38 in position. The first motion-transmitting rod 40 is circumferentially grooved to receive a snap ring 96 which serves as a forward abutment for a helical compression spring 98, the rearward end of which abuts the forward end of the ball bushing 38. The hollow shaft or barrel 30 near its rearward end is drilled and threaded to receive a set screw 100, the reduced diameter nose of which extends into a longitudinal groove 102 in the first motion-transmitting rod 40 near the rearward end thereof. The latter is provided with a flat-bottomed notch 104.

Mounted on the rearward or outer end portion of the first motion-transmitting rod 40 adjacent the notch 104 therein in telescoped relationship therewith are the correspondingly telescoped and alignedly-drilled forward portions 106 and 108 respectively of a cup-shaped sleeve 110 and a hollow chuck 112. A clamping set screw 114 extends through the drilled portions 106 and 108 (the drilled portion 106 being also threaded) and engages the flat-bottomed notch 104 to form a driving connection between the sleeve 110, the chuck 112 and the first motion-transmitting rod 40.

The forward portion 108 of the chuck 112 is flanged at its rearward end to abut a sleeve 116 which is drilled and threaded near its inner end to receive set screws 118, the conical inner ends of which engage alignedly drilled opposite sides of a tubular bearing spacer 120 disposed radially outward away from the central tubular extension 122 of the forward portion 108 of the chuck 112. Spaced longitudinally apart from one another by the spacer 120 are two anti-friction bearings 124, such as ball bearings, the rearmost one of which is held in place by a cup-shaped cap 126. The latter is bored centrally to slidably receive the rearward end of a rearward or third motion-transmitting rod 128, the forward end of which carries a similarly-bored plug 129 secured thereto and urged inward by a compression spring 131. The rod 128 at its forward end engages the rearward end of the second motion-transmitting rod 64 while its rearward end engages the forward end of the dial indicator plunger 130 mounted in the stem 132 of the dial indicator 22 (FIG. 3). The sleeve 116 is seated in a socket 134 in the cup-shaped forward portion 136 of a dial indicator holder 138 having a body portion 140 containing a cup-shaped recess 142. The recess 142 receives the dial indicator 22 and also has a bore 144 through which the dial indicator stem 132 projects into the socket 134. The dial indicator 22 is conventional and well known, hence its details are beyond the scope of the present invention. It is provided with the usual spindle 146 connected by the usual motion-multiplying gearing (not shown) to the plunger 130 so as to rotate an indicator needle or pointer 148 relatively to a graduated annular scale 149 and indicate thereon the motion of the plunger 130, as more fully explained below.

In the operation of the invention, let it be assumed that the operator has pushed the barrel or hollow shaft 30 of the gauge 10 through the guide bushing reference bore 12 until it is halted by the engagement of the handle 80 with the flange 24. Let it also be assumed that the left-hand end (FIG. 2) of the quadrant slot 88 is in engagement with the stop pin 28, and that the forward end portion 56 of the barrel or hollow shaft 30 has entered the bore B of the workpiece W so that the first and second probes 46 and 58 are pushed inwardly thereby toward one another.

The inward motion of the first probe 46 is transmitted through its contact edge 44 to the inclined nose portion 42 of the first or tubular motion-transmitting rod 40, which in turn moves the entire assembly 150 of the cup-shaped sleeve 110, dial indicator holder 138 and dial indicator 22 bodily to the right with a two-to-one ratio of motion reduction. Thus, as no motion is imparted to the dial indicator plunger 130, no motion of its needle or pointer 148 occurs. The inward motion of the second probe 58, however, is transmitted in a two-to-one ratio of motion reduction to the second motion-transmitting rod 64 by the engagement of the contact edge 60 with the inclined nose portion 62. This action shifts the second motion-transmitting rod 64 and the rearward motion-transmitting rod 128, causing the plunger 130 of the dial indicator 22 to rotate the spindle 148 thereof through the previously-mentioned motion-multiplying gearing (not shown) so as to move the needle or pointer 148 to a particular graduation on the annular graduated scale 149.

The operator now grasps the handle 80 and rotates the entire gauge 10 through an angle of 90°, causing the opposite end of the arcuate quadrant slot 88 (FIG. 2) to come into engagement with the stop pin 28. This halts the gauge 10 one-quarter of a revolution, or 90°, from its previous position shown in FIG. 2. If the workpiece bore B is accurately concentric with the axis of the bore 12 of the guide bushing 14 in the master fixture 20, the probes 46 and 58 will not move during this quarter-revolution of the gauge 10 and consequently no motion of the dial indicator needle 48 will occur. If, on the other hand, there exists eccentricity of the workpiece bore B relatively to the guide bushing reference bore 12, the first probe 46 will move transversely to the barrel or hollow shaft 30 and transmit half of this motion to the dial indicator holder 138 with the dial indicator 22 therein, causing no motion of the needle 148 on that account. The eccentricity of the workpiece bore B, however, also moves the second probe 58 in the same direction as the first probe 46 and transmits half of its motion to the second motion-transmitting rod 64. Thereupon, the second motion-transmitting rod 64 transmits the same linear motion to the rearward motion-transmitting rod 128 and thence to the dial indicator plunger 130, thereby causing the needle 148 to swing relatively to the graduated scale 149. As a result, the needle 148 gives a direct reading, upon the graduated scale 149, of the exact amount of eccentricity existing at the particular position being measured momentarily in the workpiece bore B relatively to the reference bore 12, because of the differential motion in the same direction taking place between the two probes 46 and 58 without any need for the time-consuming bore-sweeping procedures and computations previously required with conventional hole location or bore concentricity gauges.

I claim:

1. A differential-probe hole-location gauge adapted to be rotatably mounted in a reference bore of a master fixture to activate the plunger of a conventional dial indicator for measuring the location or concentricity of a workpiece bore relatively to said reference bore, said gauge comprising an elongated probe-supporting structure having means engageable with the reference bore for aligning said structure therewith and having a longitudinal bore therethrough and having a forward portion containing a probe bore disposed transversely to said longitudinal bore and communicating therewith, first and second workkpiece bore probes slidably mounted in said probe bore for transverse differential motion therein relatively to one another, first and second motion-transmitting members reciprocably mounted in said longitudinal bore with forward portions extending into said transverse bore, a first tranverse-to-longitudinal motion-converting device disposed between said first probe and said forward portion of said first motion-transmitting member, a second transverse-to-longitudinal motion-converting device disposed between said second probe and said forward portion of said second motion-transmitting member.

a dial indicator holder and a coupling structure connected to one another and also connected to one of said motion-transmitting members for travel unitarily therewith, and means adapted to operatively connect the other of said motion-transmitting members to the plunger of the dial indicator to indicate relative displacement between said first and second motion-transmitting members.

2. A differential-probe hole-location gauge, according to claim 1, wherein said first motion-transmitting member is tubular and wherein said second motion-transmitting member is disposed within said first motion-transmitting member in telescoping relationship therewith.

3. A differential-probe hole-location gauge, according to claim 2, wherein a relative-rotation-preventing means is connected between said motion-transmitting members.

4. A differential-probe hole-location gauge, according to claim 1, wherein each of said probes has a contact portion thereon and wherein each of said motion-transmitting members has an inclined portion operatively engageable with one of said contact portions.

5. A differential-probe hole-location gauge, according to claim 4, wherein each of said inclined portions is disposed at an angle of substantially 26° and 34 mins.

whereby to effect a two-to-one reduction in the linear distance of motion of each probe relatively to the respective motion-transmitting member engageable with the contact portion thereof.

6. A differential-probe hole-location gauge, according to claim 1, wherein a resilient element is interposed between the inner ends of said probes and urges said probes away from one another.

7. A differential-probe hole-location gauge, according to claim 1, wherein said coupling structure has a forward portion fixedly secured to said first motion-transmitting member and has a rearward portion secured to said dial indicator holder.

8. A differential-probe hole-location gauge, according to claim 7, wherein said rearward portion comprises a rotary bearing element interconnecting said dial indicator holder and said forward portion.

9. A differential-probe hole-location gauge, according to claim 8, wherein said rotary bearing element comprises a rotary chuck.

10. A differential-probe hole-location gauge, according to claim 8, wherein said connecting means includes a rearward motion-transmitting member slidably mounted in the forward portion of said coupling structure.

* * * * *